United States Patent [19]

Musil

[11] Patent Number: 4,694,958
[45] Date of Patent: Sep. 22, 1987

[54] SAFETY STRIP FOR WIRE HOOK FASTENERS

[75] Inventor: Edward C. Musil, Lyons, Ill.

[73] Assignee: Flexible Steel Lacing Company, Downers Grove, Ill.

[21] Appl. No.: 808,522

[22] Filed: Dec. 13, 1985

[51] Int. Cl.⁴ .............................................. B65D 85/24
[52] U.S. Cl. .................................... 206/340; 206/338
[58] Field of Search ................ 24/31 H; 206/338–348, 206/820

[56] References Cited

U.S. PATENT DOCUMENTS

| | | |
|---|---|---|
| 484,608 | 10/1892 | Pfouts . |
| 1,066,801 | 7/1913 | Diamond . |
| 1,183,173 | 5/1916 | Diamond . |
| 1,198,897 | 9/1916 | Diamond . |
| 1,220,298 | 3/1917 | Vanderveld . |
| 1,306,107 | 6/1919 | Elliott . |
| 1,660,644 | 2/1928 | Coats . |
| 1,781,476 | 11/1930 | Rousseau ............................ 206/338 |
| 1,801,566 | 4/1931 | Olsen . |
| 1,885,237 | 11/1932 | Diamond . |
| 1,894,981 | 1/1933 | Diamond . |
| 2,015,492 | 9/1935 | Messinger . |
| 2,023,220 | 12/1935 | Diamond . |
| 2,164,049 | 6/1939 | Bray . |
| 2,420,783 | 5/1947 | Koester . |
| 2,481,085 | 9/1949 | Claus . |

FOREIGN PATENT DOCUMENTS 1056098  2/1954  France ................................. 206/348

Primary Examiner—Stephen Marcus
Assistant Examiner—Jimmy G. Foster
Attorney, Agent, or Firm—Fitch, Even, Tabin & Flannery

[57] ABSTRACT

A safety strip for shielding and covering the pointed ends of generally triangular shaped hooks of a longitudinal wire hook fastner strip is described, the safety strip including a cover and flexible detent means for detenting engagement with the wire hook fastener strip.

8 Claims, 4 Drawing Figures

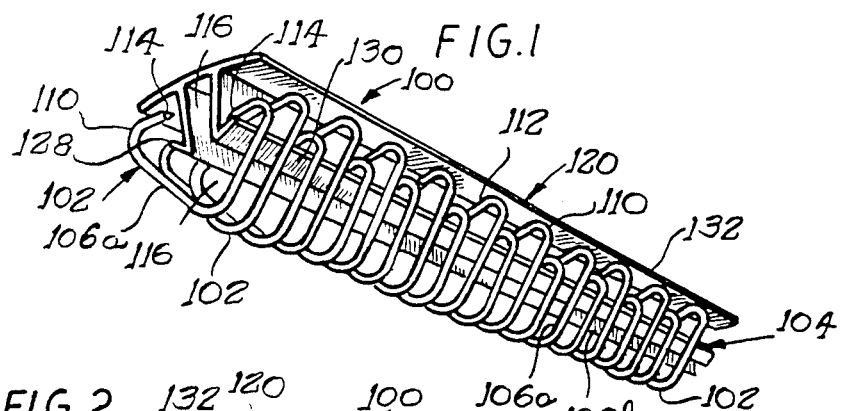
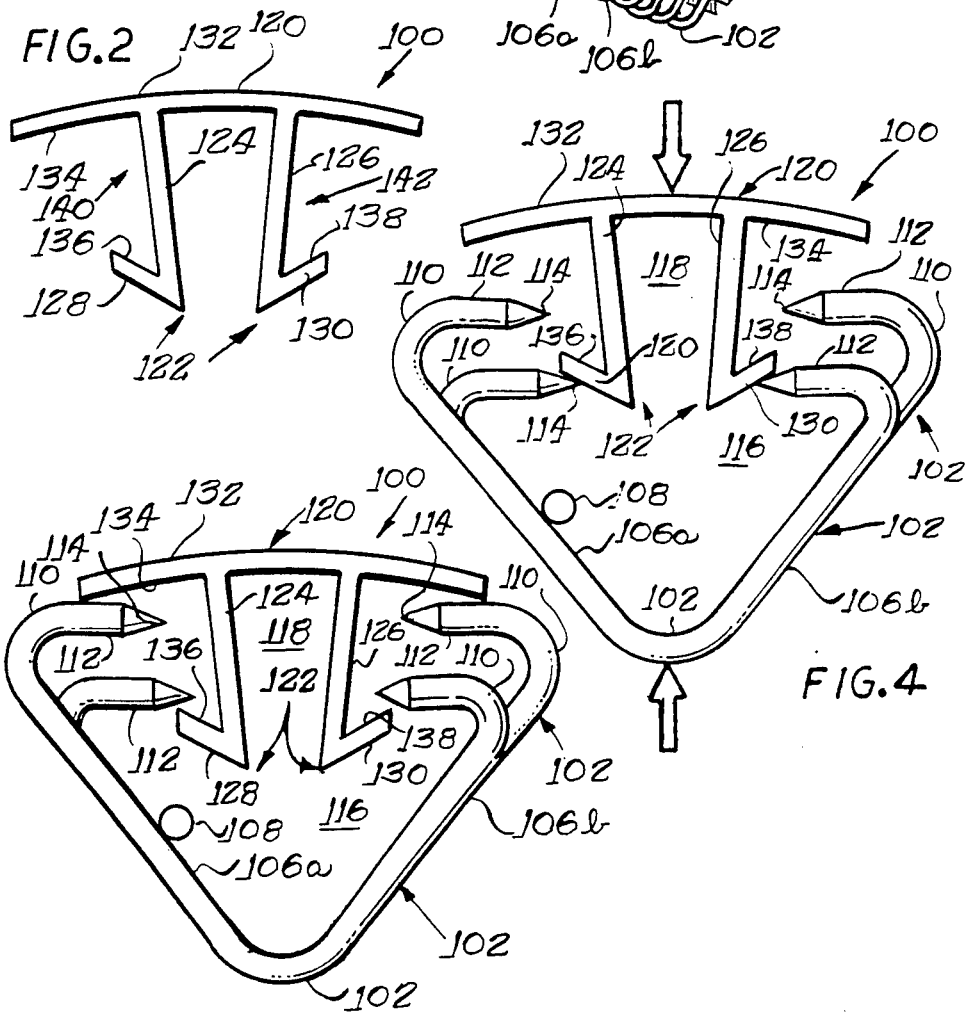

SAFETY STRIP FOR WIRE HOOK FASTENERS

This invention relates to wire hook fasteners and protective strip therefor. More particularly, this invention relates to strip for shielding the hooks of wire hook fasteners so that the fasteners may be safely handled during shipping and their application without having the hooks of the fasteners cut or prick personnel, or damage packaging equipment and material.

Wire hook fasteners for belt connecting or lacing provide a plurality of sharp generally triangular-shaped hooks which are arranged in longitudinal strips. In these strips the hooks are held in spaced parallel relation by means such as paper board strips or a wire welded to each individual hook. The ends of each hook have arms which are bent inwardly forming a hook generally triangular in shape. Each arm terminates into a sharpened point for insertion of the hooks and the fastener into the belting to join belt ends.

For application in joining or lacing belts, the desired length of the wire hook fastener strip is ascertained. After the length of the wire hook fastener strip has been determined, it is cut or broken by twisting and fatiguing the metal and then the hooks of the fastener are inserted into the belting to join it. Heretofore wire hook fasteners have been difficult to ship and handle because they present a series of sharp hooks which not only can injure personnel, but damage packaging, material and equipment. Also, in shipping or storage, when the hooks are left exposed, adjacent strips often become entangled with the hooks of one strip hooked into the hooks of another strip. Such entanglement is an annoyance.

While safety strips are known which prevent entanglement of adjacent strips and which shield personnel and material from injury and damage, these devices have not been without disadvantages. One disadvantage has been that the protective strip has had to be slipped over the end of the longitudinal strip of hooks over the sharp points or teeth of the hooks of the fastener and slid down the fastener for protective and shielding engagement with the fastener. This is time consuming. This telescoping of a safety strip through the hollow interior of the hook fastener is not readily accomplished where a hook is out of line or when the strip is canted relative to a longitudinal axis through the hollow interior of the strip. Moreover, the sliding insertion of the safety strip does not permit the insertion of the strip in an area where space is extremely limited because an area having almost double the length of the strip is needed to slip the strip over the end hooks of the fastener for sliding engagement therewith. The safety strips are also very useful in breaking a strip of fasteners to a particular size to fit a given belt width. At the location of the break, one safety strip entering from one side was stopped and a second safety strip was slid from the opposite side to abut its inner end against the inner end of the first safety strip. Then, grasping the safety strips and the hook fastener strip, the safety strips were twisted in opposite directions to break the connecting means for the individual hook fasteners at the location of the abutted inner ends of the safety strips. The telescoping of the two strips is time consuming and sometimes difficult to accomplish.

It is an object of this invention to provide a new and improved safety strip for shielding the sharp points of the hooks of a wire hook fastener strip to allow handling and shipping of the fastener without injury or damage to personnel and material.

It is another object of this invention to provide safety strip for shielding the sharp points of the hooks of a strip of wire hook fasteners which strip may be slid into the fastener strip and/or snappingly engage the fastener strip.

It is yet another object of this invention to provide safety strip for a wire hook fastener strip such that more than one piece of safety strip may be easily inserted into the fastener strip to shield the hooks of the fastener strip during cutting or breaking the fastener strip to desired size prior to insertion and application of the fastener strip.

These and other objects of the invention will become more apparent with reference to the following detailed description and drawings of which:

FIG. 1 is a perspective view of a wire hook fastener strip with safety strip inserted therein;

FIG. 2 is an end view of the safety strip;

FIG. 3 is an end view of the safety strip inserted into a wire hook fastener strip; and FIG. 4 is a schematic representation of the safety strip being snapped into the wire hook fastener strip.

Generally, the present invention provides a safety strip for covering the sharp hooks of individual fasteners aligned and secured together to form a fastener strip and a detent means to snappingly engage the fastener strip to lock together the safety and fastener strips. Generally, fastener strip includes a plurality of triangular shaped hooks with inwardly bent arms extending from two legs in a V-shaped configuration, the arms terminating in sharp points. According to the invention, the safety strip comprises a longitudinal spine having a top surface and a bottom surface, a longitudinal axis which lies in a plane which extends generally between inwardly bent arms of the hooks of the wire hook fastener strip, the spine generally overlying the hooks of the wire hook fastener strip; means for extending from the bottom surface of the spine, the extending means emanating and extending from the spine between the inwardly bent arms of the hooks of the wire hook fastener strip; and at least two feet extending away from each other, the extending means, the longitudinal axis of the spine and upwardly to the bottom surface of the spine, the feet having an angular surface to interface with the arms of the hooks of the wire hook fastener strip so that upon the application of force in a direction generally normal to the top surface of the spine, the extending means resiliently compresses to permit the feet to snappingly engage the arms of the hooks of the wire hook fastener strip in an area between the feet and the lower surface of the spine. Preferably, the top surface of the spine is convex and the bottom surface of the spine is concave to permit the spine to accurately overlie the arms of the hooks of the fastener strip and conform the shape of the spine to the shape of the hooks of the fastener strip which are inwardly bent towards one another. Preferably the means for extending includes two downwardly extending legs which are on each side of the longitudinal axis of the spine in spaced adjacent relation, the legs generally tapering toward one another from the spine and which legs may be resiliently compressed toward one another upon the abutment of the feet with the arms of the hooks of the fastener strip and the application of force generally normal to the top surface of the spine.

Referring now to FIG. 1 of the drawings, a protective strip 100 is shown interengaged with a series of wire hook fasteners 102 aligned parallel into a longitudinally extending strip 104 of hook fasteners. Each wire hook fastener includes a triangular-shaped body formed by two legs 106a and 106b angularly extending from one another in a V-shaped configuration. The hooks are held in spaced adjacent relation by a suitable connecting means such as a longitudinally extending rod 108 which is fixedly connected to the hooks by welding or the like as is known. Each end of each of the legs in the V-shaped configuration is bent inwardly as at 110 forming inwardly bent arms 112. The arms terminate in sharp points 114 which point towards one another. The legs and arms form a hook fastener having a triangular shape with one side of the triangle being open at the space between the sharp points. In the illustrated embodiment, leg 106a is slightly longer than leg 106b; hence, the inwardly bent arm of leg 106a is slightly above the arm extending from leg 106b, the arms in two generally horizontal and parallel planes which also are generally parallel and spaced from the spine of the safety strip. Upon application of the fastener hooks to a belt, the arms of the hooks fastener of one fastener strip are inserted into one end of the belt or belts and the hooks of a second fastener strip are inserted into the other opposing end of the belt or belts. The points on one hook of a fastener strip penetrate one belt. The hooks of the second fastener strip penetrate the opposing end of the belt to be joined. The hooks are bent and deformed at the apex of the V to have the arms penetrate the belting to hold the ends of the belt in abutting adjacent relation. After the fastener strips have been associated with the belting with the legs of the hooks forming loops at the apex of the hooks, the loops formed by the hooks of one fastener strip are held in alternate adjacent relation with the loops formed by the hooks of the second fastener strip and a hinge pin is passed through the loops to complete the joint between the belts.

As can be seen in FIG. 1, the hook fasteners 102 are held aligned to define a hollow interior or bore 116 extending the length of the fastener strip and into which may be inserted a safety strip. Heretofore, a plastic strip (not shown) was telescoped into this hollow interior bore 116 from end of the fastener strip with a portion of the safety strip projecting upwardly through a gap 118 between the facing points 114 and an exterior portion (not shown) of the safety strip extended over and covered the points. To telescope this safety strip (not shown) into the interior bore 116 of the fastener strip, one had to carefully align and hold the longitudinal axis of the strip with the longitudinal axis of the bore 116. There is a tendency for the leading of the strip to snag onto one of the points during such telescoping movement. When breaking a fastener strip to a given size, one usually telescoped a second strip into the bore 116 to abut the end of another safety strip at the location of the break and then the safety strips and their engaged portions of the fastener strips were turned in opposite directions to break the wire rod 108 between adjacent fastener hooks. Such manual telescoping manipulation is time consuming particularly when the leading end of a safety strip catches on a hook. In manufacture of this combined telescoped safety strip and fastener strip, considerable space is needed to allow equipment to insert the safety strip in a telescoping movement.

In accordance with our present invention, the safety strip 100 may be conventionally snapped into place through the throat or gap 118 formed by the points 114 and interlocked with the safety strip without any aligning and telescoping movement. This is achieved by forming the safety strip with an exterior cover or spine 120 to cover the sharp points and with attached flexible members preferably in the form of a detent means 122 which may be flexed inwardly past the sharp hook points 114 and through the gap 118 with the detent means snapping underneath the points to prevent outward movement of the detent means 122 through the gap. The preferred detent means includes pairs of spaced legs 124 and 126 which are flexed inwardly during insertion through the gaps and which carry feet 128 and 130 on their distal ends which will abut the interior facing sides of the points 114 to prevent withdrawal of the legs through the gap. To remove the safety strip, it must be slid longitudinally along the fastener strip to exit the feet from a given end of the fastener strip.

Referring now in greater detail to the illustrated preferred embodiment of the invention, the strip 100 which may be extruded or injected high impact polystyrene, polyvinyl chloride, acrylonitrile-butadienestyrene copolymer (ABS) or the like includes the longitudinal spine 120 having a convex top surface 132, a concave bottom surface 134 and a longitudinal axis which lies in a plane which extends between and which is perpendicular to the sharp points of the hooks of the wire hook fasteners. The detent means 122 includes two legs 124 and 126 emanating and extending from the bottom surface of the spine. The legs extend the length of the spine, are in spaced relation on each side of the longitudinal axis of the spine and taper towards one another as they extend from the spine terminating in feet 128 and 130.

The feet 128 and 130 extend the length of the spine and legs. The feet angularly extend upwardly from the ends of the legs toward the bottom surface of the spine. The feet have outer interfacing surfaces 136 and 138 which interface and abut the inwardly bent arms and sharpened points 114 of the triangular-shaped hooks of the wire hook fasteners when the detent means is placed between the points and arms for snapping engagement of the safety strip with the wire hook fasteners. Upon such snapping engagement, the sharp points and the inwardly bent arms engage the strip in areas 140 and 142 defined by the upwardly extending feet and the lower surface of the longitudinally extending spine. When the safety strip snappingly engages the fastener strip, the lower surface of the spine abuts the arms extending from the longer legs, and the feet abut the arms extending from the shorter legs.

The safety strip 100 may be made in any size to accommodate the size of the wire hook fastener, however, by way of example, for a No. 4 wire hook fastener the spine will be about 0.63 inches wide, and be curved to have a radius of about 1.12 inches; the outer surface of the lower portion of legs facing away from each other will be spaced apart about 0.18 inches, the outer surface of the upper portion of the legs being spaced apart about 0.23 inches; the tips of the feet extending away from each other on opposing legs will be separated about 0.328 inches from each other, the tip of each foot being about 0.070 inches from the surface of the leg from which it extends. Each foot forms an angle of about 60° with the out surface of the leg from which it extends, each foot terminating about 0.17 inches below the bottom surface of the spine.

The safety strip 100 is engaged with the wire hook fastener by pressing the detent means 122 between the sharp hooks 114 of the wire hook fasteners for snapping engagement therewith. For snapping engagement of the safety strip, the detent means is placed generally between the arms of the hooks of wire hook fasteners, the interfacing surfaces of the feet extending from the legs abutting the points and inwardly bent arms of the triangular-shaped hooks of the wire hook fastener strip. Upon the application of force generally normal to the top surface of the spine 132, the inwardly bent arms and points thereon of the hooks push on the angled interfacing surface of the feet and move the legs toward one another and toward a plane which is normal to the spine and between the sharp points of the hooks of the fastener strip. Upon the application of sufficient force normal to the spine, the legs move sufficient distance toward one another to cause the tips of the feet to slide under the tips of the sharpened hooks, upon which the legs and feet resiliently return to the original position trapping the inwardly bent arms of the hooks between the feet and the lower surface of the spine for snapping engagement of the strip with the wire hook fastener. For removal of the strip from the fastener, the strip preferably is slid longitudinally along the fastener strip bore 118 to remove all the hooks of the fastener strip from the area between feet and the lower surface of the spine. Alternatively, the safety strip 100 could be telescoped onto a strip of fasteners if so desired; but the preferred manner of joining the safety strip to the fastener strip is by snapping them together.

For sliding engagement of the strip 100 within the strip of wire hook fasteners, the legs at the end of the strip are aligned with the space between the inwardly bent arms of the hooks of the fasteners such that the legs of the safety strip will extend between the sharp hooks; the feet of the safety strip are aligned with the area between the inwardly bent arms and the legs of the fastener strip in V-shaped configuration. Upon such alignment, the safety strip is slid onto the fastener strip such that the arms of the hooks are between the feet and the lower surface of the spine of the safety strip which interlocks the fastener strip with the safety strip. The arms of the hooks in the fastener strip extending from the longer legs generally abut the lower surface of the spine; the arms of the hooks extending from the shorter legs generally abut the surface of the feet opposite the lower surface of the spine. The safety strip is removed from the fastener strip preferably by reversing the process and sliding the strip longitudinally the length of the fastener strip to release the arms of the hooks from the area between the feet and the lower surface of the spine.

This invention provides safety strip for shielding the sharp hooks of wire hook fasteners which safety strip may be slid into or snappingly engaged with the wire hook fastener strip. In the embodiment shown, the legs of the hooks of the fastener strip are long and short which provide inwardly bent arms which are in alternate generally parallel planes which arms when engaged with the strip engage either the bottom surface of the spine or the feet of the safety strip. However, the legs of the hooks of the fasteners may be of the same general size and in which case such inwardly bent arms will be in the same plane. In the latter case, the arms of the hooks when engaged with the safety strip also will be located in the area between the feet and the lower spine of the safety strip, but all of the arms will generally be held in an abutting relation to the feet and the lower surface of the spine.

It should be understood that while certain preferred embodiments of the present invention have been illustrated and described, various modifications thereof will become apparent to those skilled in the art, and accordingly, the scope of the present invention should be defined only by the appended claims and equivalents thereof.

Various features of the invention are set forth in the following claims.

What is claimed is:

1. A safety strip for protecting and covering the pointed ends of generally triangular shaped wire fasteners held in parallel relationship in a strip, the safety strip comprising:
   a body of plastic for extending longitudinally along the length of the strip of parallel wire fasteners,
   an exterior cover portion on the body having a flange of a predetermined width extending outwardly of the pointed ends for covering the pointed ends of the wire fasteners,
   a flexible detent means on the body and projecting from the exterior cover portion inwardly through a throat formed by the sharp hooks for detenting engagement with the wire fasteners, the detent means having a pair of depending legs attached at upper ends to a central portion of the flange, said legs being flexible and deflected inwardly by the pointed ends of the wire fasteners when being pressed through the throat and expanding outwardly after passing through the throat, and
   feet on the lower free ends of the legs inclined upwardly and outwardly to be engaged by the hooked ends, said feet defining with said flange a pair of parallel channels with pointed end of the wire fasteners in the channels.

2. Safety strip for shielding hooks of a strip of wire hook fasteners, the strip comprising:
   a longitudinal spine having a top surface and bottom surface and a longitudinal axis which lies in a plane which extends generally between the hooks of the wire hook fastener strip, the spine generally overlying the hooks of the wire hook fastener strip;
   means for extending from the bottom surface of the spine, the extending means between the hooks of the wire hook fastener strip;
   at least two feet extending away from each other, the extending means, and away from the longitudinal axis of the spine and upwardly to the bottom surface of the spine, the feet having an angular surface to interface with the hooks of the wire hook fastener strip so that upon application of force in a direction generally normal to the longitudinal axis of the spine the extending means resiliently compresses to permit the feet to snappingly engage the hooks of the wire fastener strip in an area between the feet and the lower surface of the spine.

3. In combination protective strip for shielding the hooks of a wire hook fastener strip and a wire hook fastener strip for joining the ends of belting, the combination comprising:
   a wire hook fastener strip which includes a longitudinal array of a plurality of triangular-shaped hooks held in spaced adjacent relation, the hooks comprising two legs angularly extending from one another, an inwardly extending arm extending from each leg, the arms terminating in juxtaposed points in spaced relation; and a safety strip engaged with the fastener strip, the safety strip including a longitudinal spine having a top surface and bottom surface and a longitudinal axis which lies in a plane which extends generally between the hooks of the wire hook fastener strip, the spine generally overlying the hooks of the wire hook fastener strip, means for extending from the bottom surface of the spine, the extending means between the hooks of the wire hook fastener strip, at least two feet extending away from each other, the extending means, and away from the longitudinal axis of the spine and upwardly to the bottom surface of the spine, the feet having an angular surface to interface with the hooks of the wire hook fastener strip so that upon application of force in a direction generally normal to the longitudinal axis of the spine the extending means resiliently compresses to permit the feet to snappingly engage the hooks of the wire fastener strip in an area between the feet and the lower surface of the spine.

4. The combination as recited in claim 3, wherein the means for extending includes at least two strip legs in spaced adjacent relation extending from the bottom surface and each side of the longitudinal axis or the spine, the legs resiliently moving toward one another to permit the feet to snappingly engage the hooks of the wire hook fastener strip; and the hooks of the fastener strip having a longer leg and a shorter leg, the inwardly extending arm on the longer leg abutting the lower surface of the spine, and the inwardly extending arm on the shorter leg abutting the feet of the safety strip.

5. The combination recited in claim 4, wherein the strip legs extending from the spine taper toward one another and move toward one another upon the application of force normal to the spine pushing the feet into abutting engagement with the hooks of the wire hook fastener strip.

6. The combination as recited in claim 5, wherein the strip legs and feet continuously extend the length of the safety strip.

7. The combination as recited in claim 6, wherein the top surface of the spine is convex and the bottom surface of the spine is concave permitting the spine to conform to curved surfaces of inwardly bent arms of the hooks of the wire hook fastener strip.

8. The combination as recited in claim 7, wherein the feet extend upwardly from the legs at about 60°.

* * * * *